(12) United States Patent
Gan et al.

(10) Patent No.: US 7,068,437 B2
(45) Date of Patent: Jun. 27, 2006

(54) LENS SYSTEM, AND OBJECTIVE LENS SYSTEM AND OPTICAL PROJECTION SYSTEM USING THE SAME

(75) Inventors: Mikhail Abramovich Gan, St-Petersburg (RU); Galina Victorovna Barmicheva, St-Petersburg (RU)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/779,859

(22) Filed: Feb. 18, 2004

(65) Prior Publication Data
US 2005/0007674 A1    Jan. 13, 2005

(30) Foreign Application Priority Data
Feb. 18, 2003   (RU)   ............................... 2003105184
Mar. 17, 2003   (RU)   ............................... 2003107773

(51) Int. Cl.
*G02B 3/00*   (2006.01)
*G02B 5/32*   (2006.01)

(52) U.S. Cl. ........................................ 359/651; 359/15
(58) Field of Classification Search ................. 359/15, 359/16, 19, 649, 650, 651, 753, 780, 782, 359/791
See application file for complete search history.

(56) References Cited

U.S. PATENT DOCUMENTS

| 4,300,817 | A   | 11/1981 | Betensky ................ 359/651 |
| 4,776,681 | A   | 10/1988 | Moskovich ............... 359/649 |
| 6,275,342 | B1* | 8/2001  | Sakamoto et al. ......... 359/691 |

* cited by examiner

*Primary Examiner*—David N. Spector
(74) *Attorney, Agent, or Firm*—Sughrue Mion, PLLC

(57) ABSTRACT

A lens system which compensates for various aberrations, including chromatic aberration, with an enlarged field-of-view. The lens system includes a positive element and a negative element, each positioned in an optical path of incident light. The positive element includes a first negative lens, a convex lens and a hologram optical element. The negative element includes a second negative lens.

22 Claims, 3 Drawing Sheets

000

LENS SYSTEM, AND OBJECTIVE LENS SYSTEM AND OPTICAL PROJECTION SYSTEM USING THE SAME

This application claims priority to benefit of Russian Patent Application No. 2003105184, filed on Feb. 18, 2003, and Russian Patent Application No. 2003107773, filed on Mar. 17, 2003, in the Russian Intellectual Property Office, the disclosures of which are incorporated herein by reference.

BACKGROUND OF THE INVENTION

1. Field of the Invention

The present invention relates to a lens system, and more particularly, to a lens system capable of compensating for chromatic aberration and enlarging the field-of-view, and an objective lens system and an optical projection system using the lens system.

2. Description of the Related Art

In general, objective lens systems or optical projection systems used in various optical displays or optoelectronic devices include a lens system. A conventional lens system includes an optical element having a small magnifying power for aperture aberration correction, which is arranged closer to an image plane, a double-convex lens, and a negative optical element with a concave surface, which is arranged closer to the image plane.

Such a conventional lens system is disclosed in U.S. Pat. No. 4,300,817 entitled "Projection Lens", issued on Nov. 17, 1981.

FIG. 1 illustrates a structure of the lens system disclosed in U.S. Pat. No. 4,300,817. Referring to FIG. 1, the projection lens system includes three groups G1, G2 and G3. The group G1 includes only a single lens L1 having a very weak positive optical power. The single lens L1 has one plano surface S1 and one aspheric surface S2 and corrects aperture-dependent aberrations. A single lens L2 of the group G2 is a double-convex lens with at least one aspheric surface and provides substantially the entire positive power of the projection lens system. A single lens L3 of the group G3 has a concave image-side surface S5 closest to an image plane and having a negative optical power. An object surface S6 of the single lens L3 that is closest to an object is planar, whereas the image-side surface S5 is aspheric. The single lens L3 serves as a field flattener correcting the Petzval curvature of the single lenses L1 and L2. An element L4 is a radiation shield generally used in monochromic CRT projection systems. Reference character P denotes a surface of a CRT.

However, when applying the conventional lens system to an objective lens system, there are considerable limitations on the correction of aberrations occurring due to the diameter of the optical system pupil since an element that is closest to the image plane is the double-convex lens, further limiting the possibility of increasing objective magnifying power.

In addition, the conventional lens system cannot fully compensate for chromatic aberration, thereby lowering the quality of images projected onto a screen.

Furthermore, as the lens in the form of a meniscus is faced concave to the image surface, the field-of-view of the objective becomes significantly narrower, thereby disabling the use of the objective in compact optical devices, due to its curvature.

In the conventional lens system illustrated in FIG. 1, all of the optical elements are made of acryl material to allow an easy formation of an aspheric surface. However, a refractive index of acryl material varies depending on temperature, so that focal points of the optical elements made of acryl material shift depending on temperature, thereby causing a defocusing or hindering a sharp focusing of the overall lens system.

To overcome these problems, in another conventional lens system disclosed in U.S. Pat. No. 4,776,681, entitled "Projection Lens" and issued on Oct. 11, 1988, a corrector lens unit having a meniscus shape was used. This corrector lens unit has an object side surface having a very large radius of curvature to compensate for an aberration, such as coma aberration, in light that goes in a direction that is not parallel to an optical axis of the lens system.

However, the corrector lens unit of the lens system disclosed in U.S. Pat. No. 4,776,681 has a lens having a convex surface of very large radius of curvature close to a screen, so that the field-of-view becomes too narrow to be applied to smaller optical devices.

SUMMARY OF THE INVENTION

The present invention provides a lens system capable of enlarging the field-of-view and compensating for aberrations.

The present invention also provides an objective lens system using the lens system, which can form a higher quality image on a screen with a larger field-of-view and correct aberrations.

The present invention also provides an optical projection system using the lens system, which can form a higher quality image on a screen with a larger field-of-view and correct aberrations.

In one aspect of the present invention, there is provided a lens system comprising: a positive component, positioned in an optical path of incident light, including a first negative lens, a double convex lens and a holographic optical element; and a negative element, positioned in the optical path, including a second negative lens.

The present invention also provides a lens system comprising: a positive component, positioned in an optical path of incident light, including a positive lens, a double convex lens and a holographic optical element; and a negative element, positioned in the optical path, including a negative lens.

In another aspect of the present invention, there is provided an objective lens system for imaging a light from an object in a predetermined shape, the objective lens system comprising a lens system including a positive component, which is positioned in the optical path, including a first negative lens, a double convex lens and a holographic optical element, and a negative element, which is positioned in the optical path, including a second negative lens.

The present invention also provides an objective lens system for imaging a light from an object in a predetermined shape, the objective lens system comprising a lens system including a positive component, which is positioned in an optical path of incident light, including a positive lens, a double convex lens and a holographic optical element, and a negative element, which is positioned in the optical path, including a negative lens.

In another aspect of the present invention, there is provided an optical projection system for projecting a light emitted from an optical light source in a predetermined shape on a screen, the optical projection system comprising: a lens system including a positive component, which is positioned in an optical path of incident light, including a first negative lens, a double convex lens and a holographic optical element, and a negative element, which is positioned in the optical path, including a second negative lens; and a coupler, which connects the optical light source to the lens system.

The present invention also provides an optical projection system for projecting a light emitted from an optical light source in a predetermined shape on a screen, the optical projection system comprising: a lens system including a positive component, which is positioned in an optical path of incident light, including a positive lens, a double convex lens and a holographic optical element, and a negative element, which is positioned in the optical path, including a negative lens; and a coupler, which connects the optical light source to the lens system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

Figure 1:
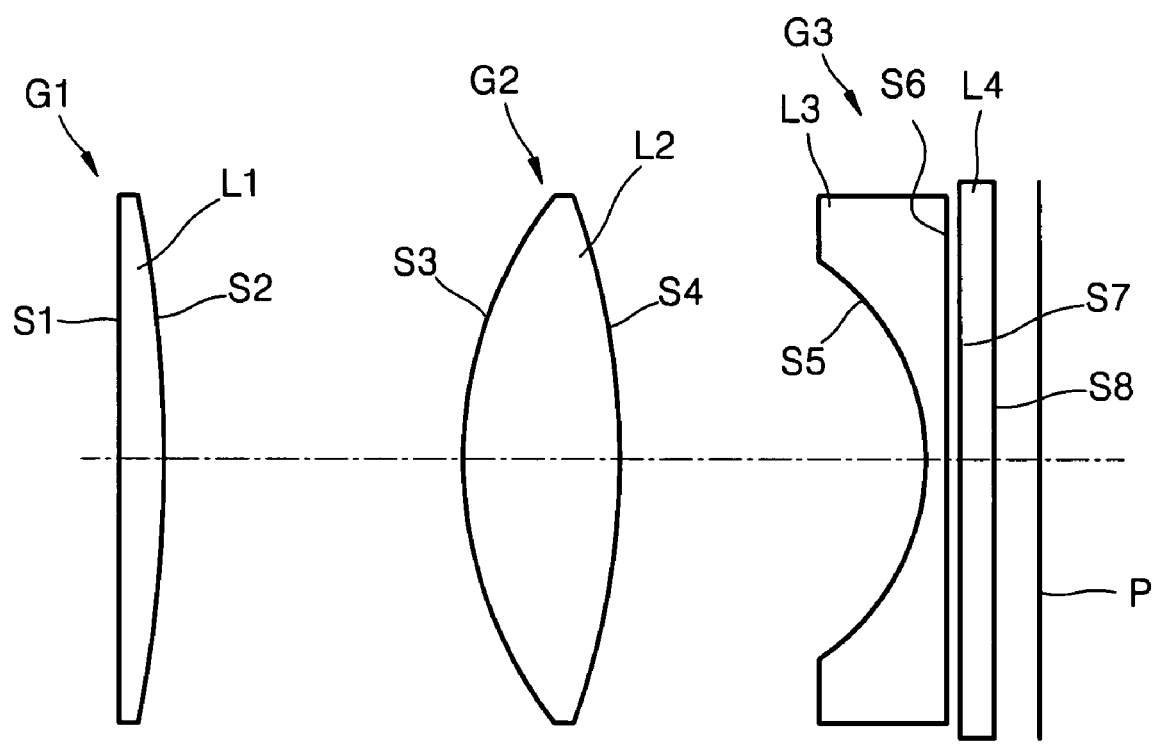
FIG. 1 is a diagram illustrating a conventional lens system for optical projection systems.
Figure 2:
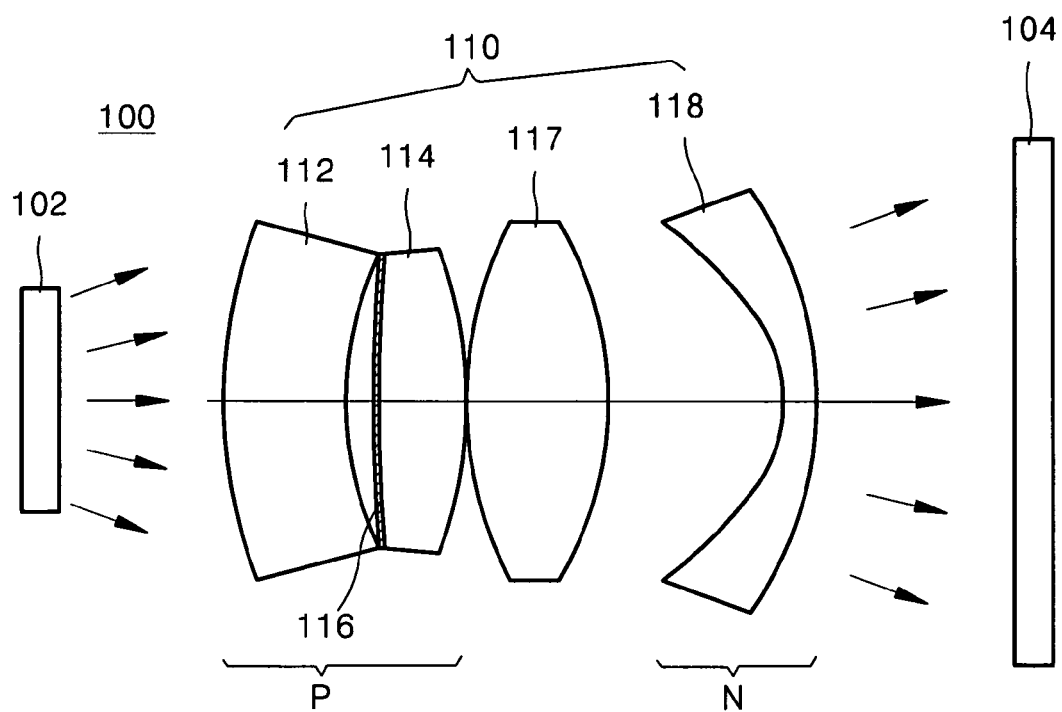
FIG. 2 is a diagram illustrating an objective lens system using a lens system according to an embodiment of the present invention.

An objective lens system using a lens system according to an embodiment of the present invention is illustrated In FIG. 2. As illustrated in FIG. 2, an objective lens system 100 according to an embodiment of the present invention includes an object 102, a lens system 110, which includes a positive component P having a positive refractive index, an auxiliary element 117, and a negative element N having a negative refractive index, and an image plane 104. The positive component P includes a first negative lens 112, a double-convex lens 114, and a holographic optical element (HOE) 116, which is formed on a surface of the double-convex lens 114 adjacent to the first negative lens 112.

The term "positive component" used throughout the specification means a group of optical elements that converges a light beam passing therethrough toward an optical axis.

In the embodiment illustrated in FIG. 2, the first negative lens 112 is positioned adjacent to the object 102, and the negative element N is positioned adjacent to the image plane 104. The auxiliary element 117 is arranged between the positive component P and the negative element N. The double-convex lens 114 is arranged between the first negative lens 112 and the auxiliary element 117.

Although the HOE 116 is illustrated as being formed on the surface of the double-convex lens 114 closest to the first negative lens 112 in the embodiment of FIG. 2, the HOE 116 may be formed on any surface of the optical elements of the positive component P.

The first negative lens 112 is made of polycarbonate and has a magnifying power ranging from 0.1 to 0.2 and a radius of curvature that is large enough to correct an aberration in a light beam impinging thereonto with a large spot size.

The double-convex lens 114 is made of acryl material and has a magnifying power ranging from 0.35 to 0.4. The double-convex lens 114 pre-focuses light. The double-convex lens 114 corrects longitudinal axial chromatic aberration, which occurs in a direction of an optical axis that is parallel to a direction in which light travels, together with the auxiliary element 117 and corrects transverse axial chromatic aberration, which occurs in a direction perpendicular to the optical axis, together with the negative lens 118.

The HOE 116 is formed on one surface of the double-convex lens 114 closest to the object 102 and has a magnifying power ranging from 0.01 to 0.1. The HOE 116 has a phase profile $V_H$ defined by equation (1) as follows.

$$V_H = A_1 y^2 + A_2 y^4 + A_3 y^6 \qquad (1)$$

where $A_1$ is a coefficient that is proportional to a magnifying power of the HOE 116, $A_2$ is a coefficient that is proportional to spherical aberration caused by the positive component P of the objective lens system 100, $A_3$ is a coefficient that is proportional to spherical aberration caused by the negative element N, and y is the distance from the optical axis of the lens measured at right angle to the optical axis.

Using the phase equation (1), a sag value that corresponds to the number of lines in the HOE 116 and the height of the HOE 116 can be calculated. For example, the HOE 116 may have a micro-structure including a plurality of concentric rings having different heights.

In the embodiment of the present invention, the HOE 116 may be formed such that a peripheral region may diffract incident light more than a center region to effectively compensate for an aberration such as chromatic aberration.

The auxiliary element 117 is made of acryl material. The auxiliary element 117 has a symmetrical shape and a similar magnifying power to the entire objective lens system 100.

The second negative lens 118 is positioned such that a convex surface faces the image plane 104. The second negative lens 118 is made of polystyrene. The second negative lens 118 may have a magnifying power of 0.5–0.7. The second negative lens 118 corrects distortion occurring in an image area.

In an alternative embodiment of the present invention, one of the first negative lens 112, the double-convex lens 114, the auxiliary element 117 and the second negative lens 118 may have at least one aspheric surface to compensate for various kinds of aberrations occurring when using a larger-magnifying power lens.

The operation of the objective lens system 100 of FIG. 2 according to the present invention will be described below.

A light emitted from the object 102 transmits through the first negative lens 112, the HOE 116, the double-convex lens 114 and the auxiliary element 117, and is subsequently diverged by the second negative lens 118 to form an image on the image plane 104. Since the first negative lens 112 of the positive component P is positioned adjacent to the object 102, and the double-convex lens 114 is positioned adjacent to the first negative lens 112, the magnifying power of the double-convex lens 114 is considerably reduced. The physical diameter of the objective lens system may be enlarged to compensate for aberrations.

Since the convex surface of the second negative lens 118 faces the image plane 104, the field-of-view of the objective lens system 100 may become larger. The auxiliary element 117, which is a double-convex lens additionally disposed between the negative element N and the positive component P, improves the focusing ability of the objective lens system 100.

Figure 3:
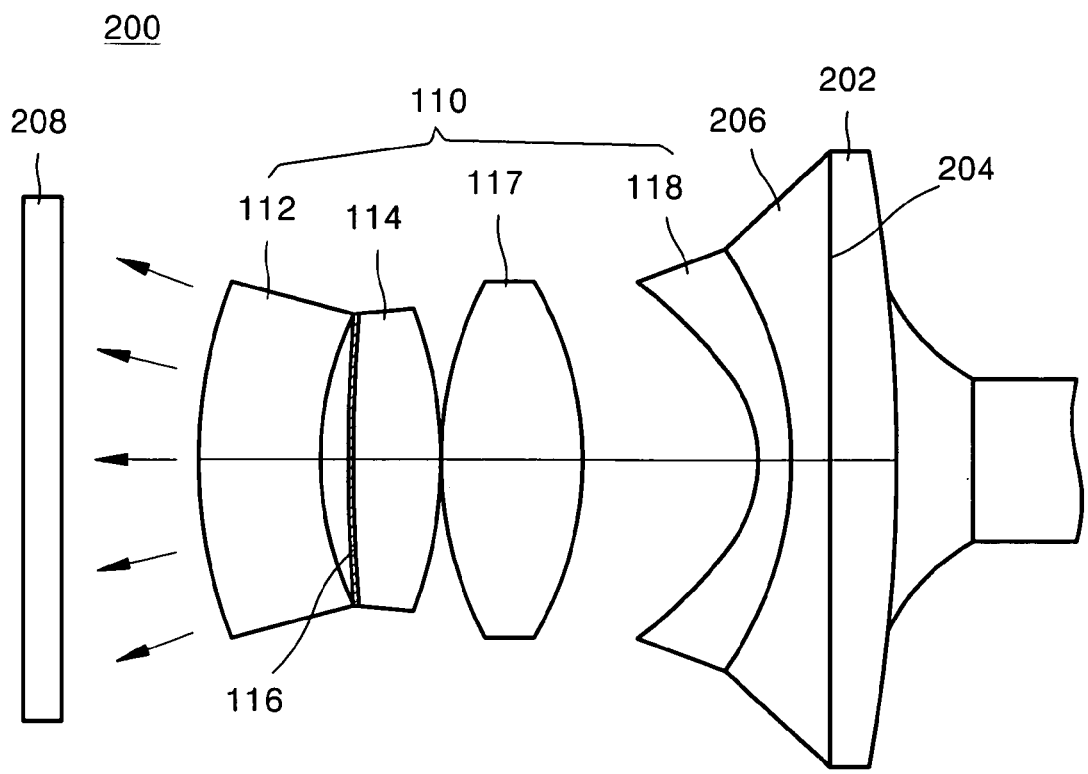
FIG. 3 is a diagram illustrating an optical projection system using the lens system in FIG. 2.

FIG. 3 illustrates an optical projection system using the lens system illustrated in FIG. 2 according to the present invention. As shown in FIG. 3, an optical projection system 200 suitable for cathode ray tube (CRT) projection televisions includes a screen 208, the lens system 110, an optical signal source 202, such as a CRT, an image plane 204, and a coupler 206 for coupling the optical signal source 202 to the lens system 110. The lens system 110 in FIG. 3 has the same structure as the lens system applied to the objective lens system 100 of FIG. 2, except that the coupler 206 containing a coolant is further arranged to connect the second negative lens 118 and the optical signal source 202, which contacts the image plane 204.

When the lens system 110 of FIG. 2 according to the present invention is applied to the optical projection system 200 as in FIG. 3, the optical path is reversed. In particular, a light emitted behind the image plane 204 is sequentially transmitted through the second negative lens 118, the auxiliary element 117, the double-convex lens 114, the HOE 116, and the first negative lens 112, and is projected onto the screen 208.

Figure 4:
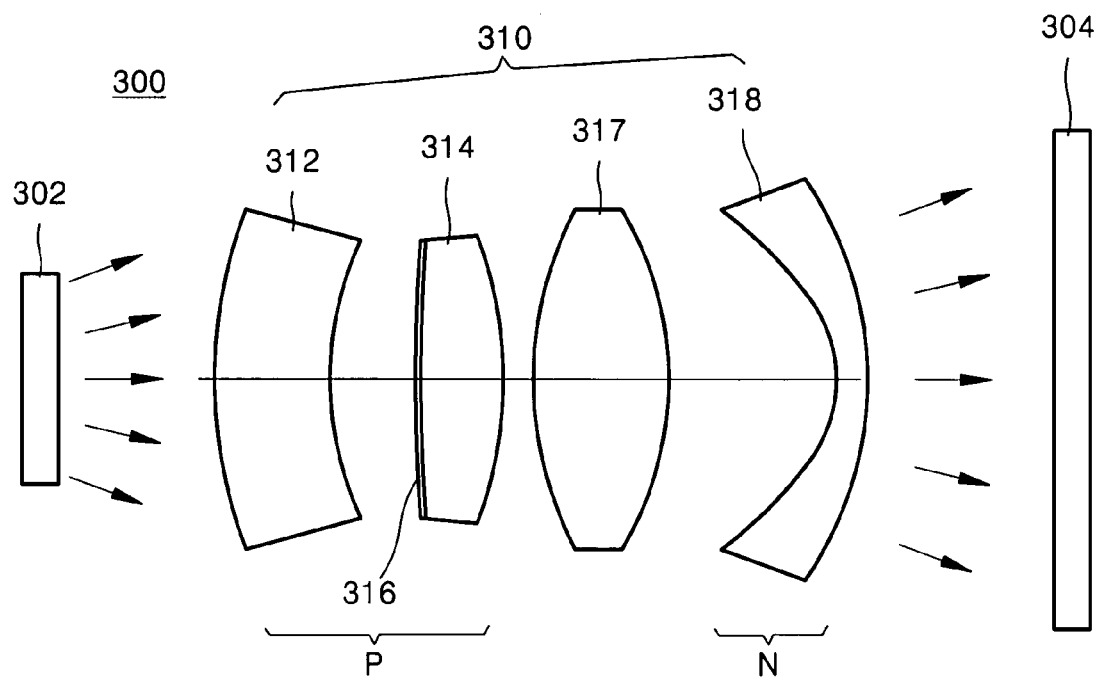
FIG. 4 is a diagram illustrating an objective lens system using a lens system according to another embodiment of the present invention.

FIG. 4 illustrates an objective lens system using a lens system according to another embodiment of the present invention. Referring to FIG. 4, an objective lens system 300 according to another embodiment of the present invention includes an object 302, a lens system 310 including a positive component P, an auxiliary element 317 and a negative element N, and an image plane 304. The positive component P includes a positive lens 312 having a meniscus shape, which is made of acryl material, a double-convex lens 314 made of acryl material, and an HOE 316 formed on a surface of the double-convex lens 314 closest to the positive lens 312.

In the embodiment illustrated in FIG. 4, the positive lens 312 is positioned between the object 302 and the double-convex lens 314 at a distance of 0.15–0.25 times a focal length of the objective lens system from the object 302. The negative element N includes a negative lens 318 having a meniscus shape and positioned near the image plane 304. A convex surface of the negative lens 318 faces the image plane 304.

In the embodiment illustrated in FIG. 4, the negative lens 318 is made of polystyrene and has a magnifying power of 0.2–0.3 times the magnifying power of the objective lens system 300.

Although in the embodiment illustrated in FIG. 4 the HOE 316 having a magnifying power of 0.01–0.1 times the magnifying power of the objective lens system 300 is formed on the surface of the double-convex lens 314 closest to the object 302, the HOE 316 may be formed on an optical surface of at least one of any of the lenses of the positive component P. The HOE 316 complies with the phase equation (1) described above in connection with the embodiment illustrated in FIG. 2.

The objective lens system 300 in FIG. 4 includes the auxiliary element 317 between the positive component P and the negative element N. The auxiliary element 317 is made of acryl material and is a double-convex lens arranged such that a surface having a smaller radius of curvature faces the image plane 304. One of the positive lens 312, the double-convex lens 314, the auxiliary element 317, and the negative lens 318 may have at least one aspheric surface to compensate for various kinds of aberrations, including chromatic aberration, which occur when a lens having a larger magnifying power is used.

Figure 5:
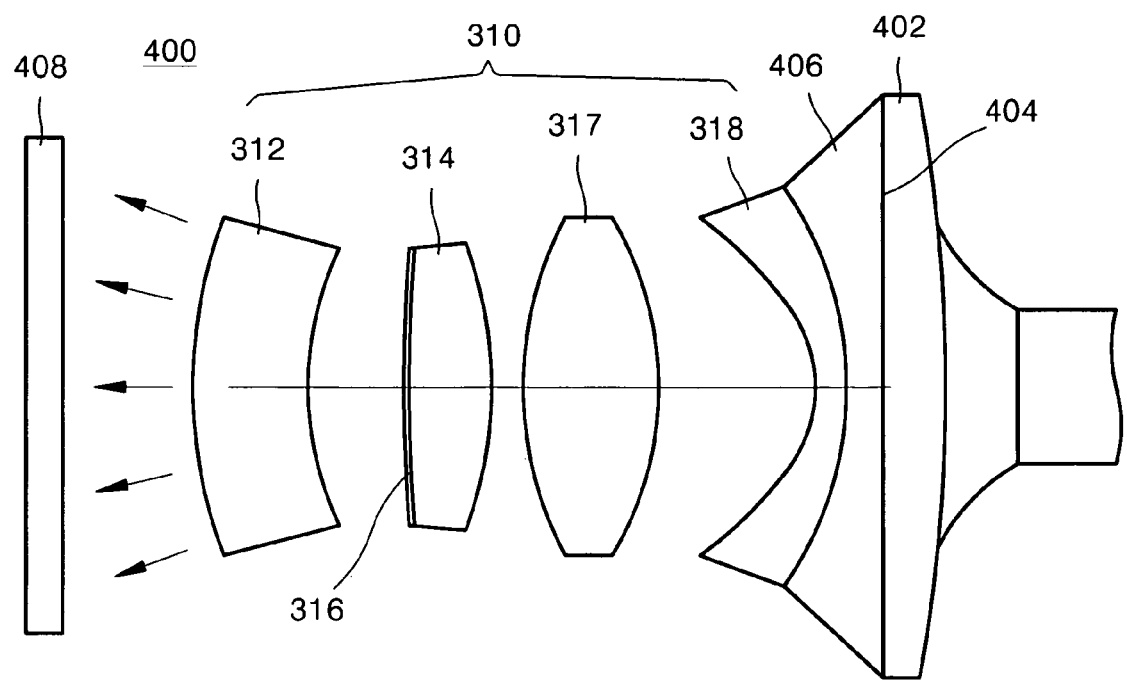
FIG. 5 is a diagram illustrating an optical projection system using the lens system in FIG. 4.

FIG. 5 illustrates an optical projection system using the lens system illustrated in FIG. 4 according to the present invention. Referring to FIG. 5, an optical projection system 400 suitable for CRT projection televisions includes a screen 408, the lens system 310, an optical signal source 402, such as a CRT, an image plane 404, and a coupler 406 for coupling the optical signal source 402 to the lens system 310. The lens system 310 in FIG. 5 has the same structure as the lens system applied to the objective lens system 300 of FIG. 4, except that the coupler 406 containing a coolant is further arranged to connect the negative lens 318 and the optical signal source 402, which contacts the image plane 404. In the optical projection system 400 illustrated in FIG. 5, there takes places a reverse process with respect to the objective lens system 300 in FIG. 4. In other words, an image formed on the image plane 404 by the optical signal source 402 is projected on the screen 408 through the lens system 310.

The lens systems according to the embodiments of the present invention can compensate for an aberration, such as chromatic aberration, and enlarge the field-of-view of the objective lens system, enabling high quality image formation.

It will be appreciated to those skilled in the art that chromatic aberration can be effectively corrected by modifying the HOE in various ways within the scope of the invention.

Although only a few embodiments of the present invention have been shown and described, it is contemplated that numerous modifications may be made to the exemplary embodiments of the present invention without departing from the principles, spirit, and scope of the invention as defined in the following claims.

What is claimed is:

1. A lens system comprising:
a positive component, positioned in an optical path of incident light, comprising a first negative lens, a double-convex lens and a holographic optical element, respectively;
a second negative lens positioned in the optical path; and
an auxiliary double-convex lens positioned in an optical path between the positive component and the second negative lens, wherein the auxiliary double-convex lens has a magnifying power similar to the lens system.

2. The lens system of claim 1, wherein the holographic optical element is disposed on at least one surface of the first negative lens and the double-convex lens comprising the positive component.

3. The lens system of claim 1, wherein the first negative lens is made of polycarbonate.

4. The lens system of claim 1, wherein the first negative lens has a magnifying power ranging from 0.1 to 0.2.

5. The lens system of claim 1, wherein the second negative lens is made of polystyrene.

6. The lens system of claim 1, wherein the second negative lens has a magnifying power ranging from 0.5 to 0.7.

7. The lens system of claim 1, wherein at least one of the first negative lens, the double-convex lens and the second negative lens has at least one aspheric surface.

8. A lens system comprising:
a positive component, positioned in an optical path of incident light, comprising a positive lens, a double-convex lens and a holographic optical element, respectively;
a negative lens positioned in the optical path; and
an auxiliary double-convex lens positioned in an optical path between the positive component and the negative lens, wherein the auxiliary double-convex lens has a magnifying power similar to the lens system.

9. The lens system of claim 8, wherein the holographic optical element is disposed on at least one surface of the positive lens and the double-convex lens comprising the positive component.

10. The lens system of claim 8, wherein the positive lens in the form of a meniscus is made of acryl material.

11. The lens system of claim 8, wherein the positive lens is positioned at a distance of 0.15 to 0.25 times a focal length of the lens system from an object imaged by said lens system.

12. The lens system of claim 8, wherein the negative lens is made of polystyrene.

13. The lens system of claim 8, wherein the negative lens has a magnifying power ranging from 0.2 to 0.3.

14. The lens system of claim 8, wherein the auxiliary element is made of acryl material.

15. The lens system of claim 8, wherein the holographic optical element has a magnifying power ranging from 0.01 to 0.1.

16. The lens system of claim 8, wherein the holographic optical element has a phase profile $V_H$ defined by the following equation:

$$V_H = A_1 y^2 + A_2 y^4 + A_3 y^6$$

where $A_1$ is a coefficient that is proportional to a magnifying power of the holographic optical element, $A_2$ is a coefficient that is proportional to spherical aberration caused by the positive component, $A_3$ is a coefficient that is proportional to spherical aberration caused by the negative lens, and y is the distance from an optical axis of the lens system measured at right angle to the optical axis.

17. The lens system of claim 8, wherein the double-convex lens is made of acryl material.

18. The lens system of claim 8, wherein the double-convex lens has a magnifying power ranging from 0.35 to 0.4.

19. An objective lens system for imaging a light from an object, the objective lens system comprising:
a system comprising:
a positive component, positioned in an optical path of the light from the object, comprising a first negative lens, a double-convex lens and a holographic optical element, respectively; and
a second negative lens positioned in the optical path after the positive component; and
an auxiliary double-convex lens positioned in an optical path between the positive component and the second negative lens, wherein the auxiliary double-convex lens has a magnifying power similar to the lens system.

20. An objective lens system for imaging a light from an object, the objective lens system comprising:
a lens system comprising:
a positive component, positioned in an optical path of the light, comprising a positive lens, a double-convex lens and a holographic optical element, respectively; and
a negative lens positioned in the optical path after the positive component; and
an auxiliary double-convex lens positioned in an optical path between the positive component and the negative lens, wherein the auxiliary double-convex lens has a magnifying power similar to the lens system.

21. An optical projection system for projecting a light emitted from an optical light source on a screen, the optical projection system comprising:
a lens system comprising:
a positive component, positioned in an optical path of the light, comprising a first negative lens, a double-convex lens and a holographic optical element; and
a second negative lens positioned in the optical path before the positive component; and
an auxiliary double-convex lens positioned in an optical path between the positive component and the second negative lens, wherein the auxiliary double-convex lens has a magnifying power similar to the lens system; and
a coupler configured to connect the optical light source to the lens system.

22. An optical projection system for projecting a light emitted from an optical light source on a screen, the optical projection system comprising:
a lens system comprising:
a positive component, positioned in an optical path of the light, comprising a positive lens, a double-convex lens and a holographic optical element;
a negative lens positioned in the optical path before the positive component; and
an auxiliary double-convex lens positioned in an optical path between the positive component and the negative lens, wherein the auxiliary double-convex lens has a magnifying power similar to the lens system; and
a coupler configured to connect the optical light source to the lens system.

* * * * *